S. A. ASQUITH.
POWER TRANSMISSION DEVICE.
APPLICATION FILED JULY 27, 1907.

899,283.

Patented Sept. 22, 1908.
3 SHEETS—SHEET 1.

WITNESSES:
H. M. Harper
O. D. Young

INVENTOR
S. Albert Asquith.
BY
G. C. Kennedy
ATTORNEY

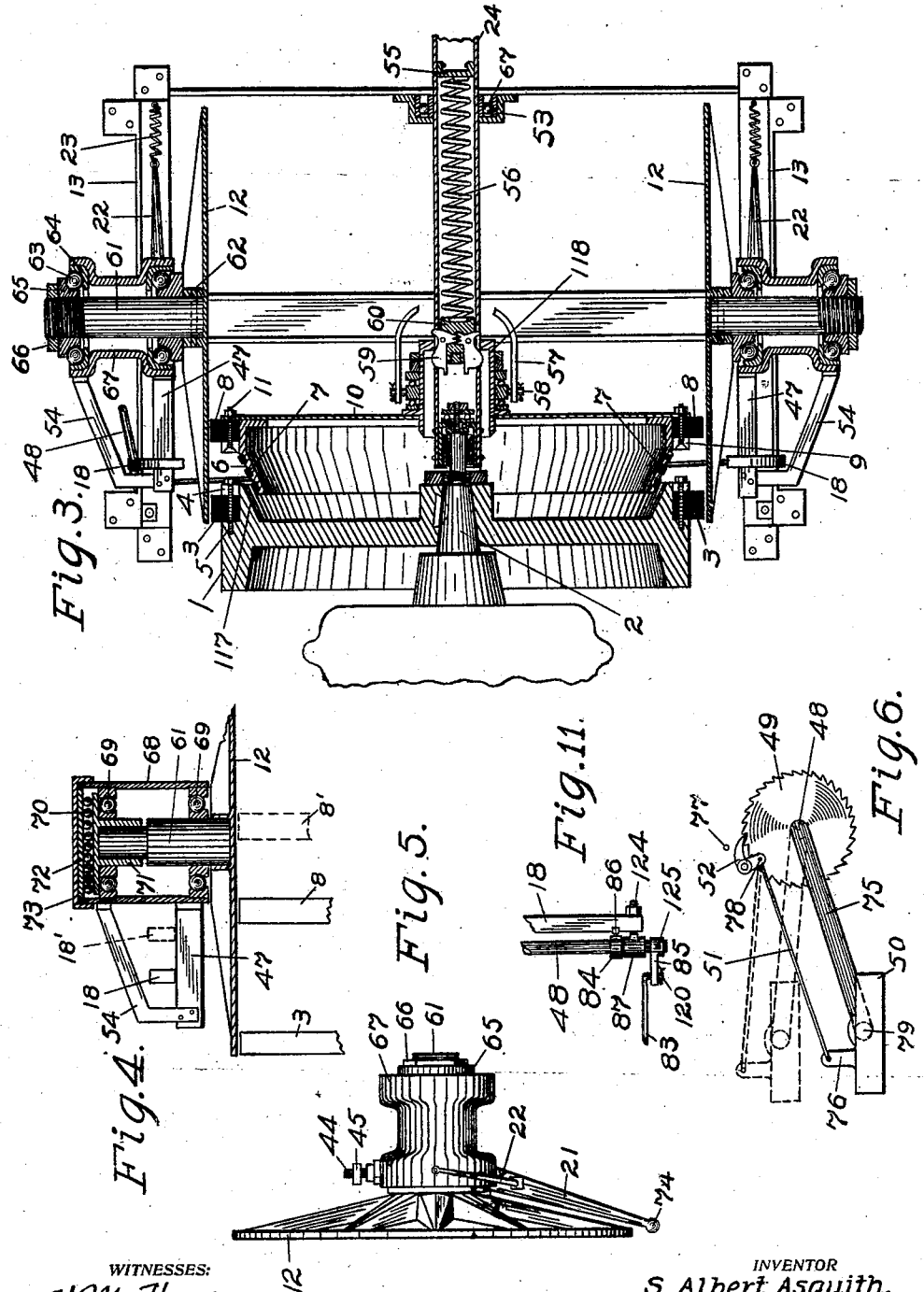

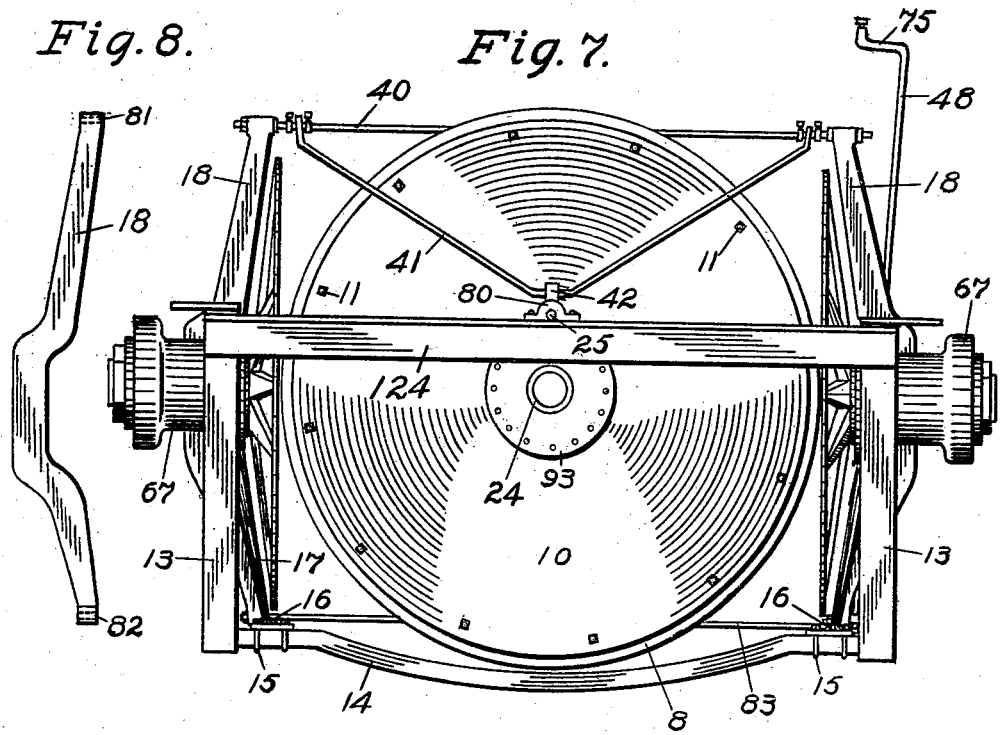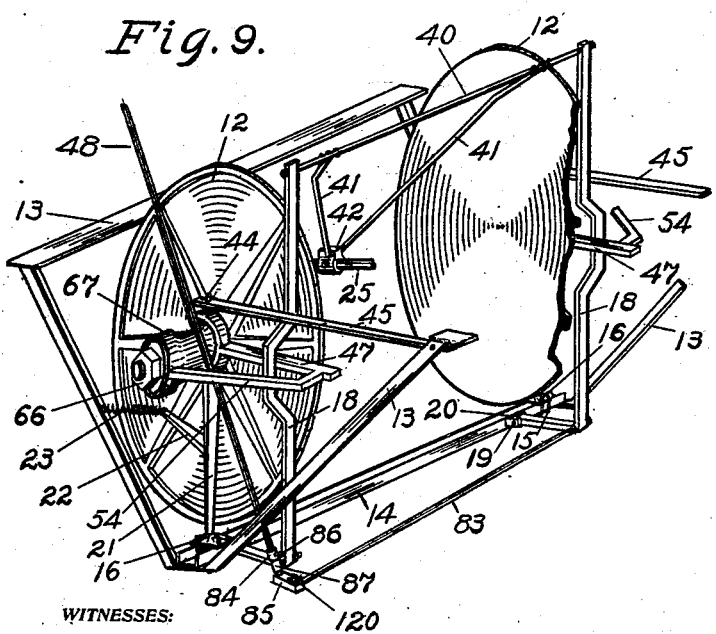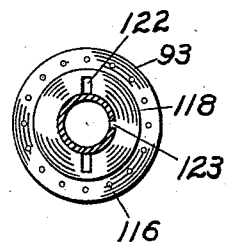

UNITED STATES PATENT OFFICE.

STEAD ALBERT ASQUITH, OF WATERLOO, IOWA.

POWER-TRANSMISSION DEVICE.

No. 899,283.　　　　Specification of Letters Patent.　　　Patented Sept. 22, 1908.

Application filed July 27, 1907. Serial No. 385,855.

*To all whom it may concern:*

Be it known that I, STEAD ALBERT ASQUITH, a citizen of the United States of America, and a resident of Waterloo, Blackhawk county, Iowa, have invented certain new and useful Improvements in Power-Transmission Devices, of which the following is a specification.

My invention relates to improvements in power transmission devices, and the object of my invention is to provide an appropriate means for transmitting power from one rotatable shaft to another, such means being adapted to reverse the direction of rotation of the driven-shaft, and to vary the rate of speed of the latter. This object I have accomplished by the mechanism which is hereinafter fully described and claimed, and which is illustrated in the accompanying drawings, in which:—

Figure 1:
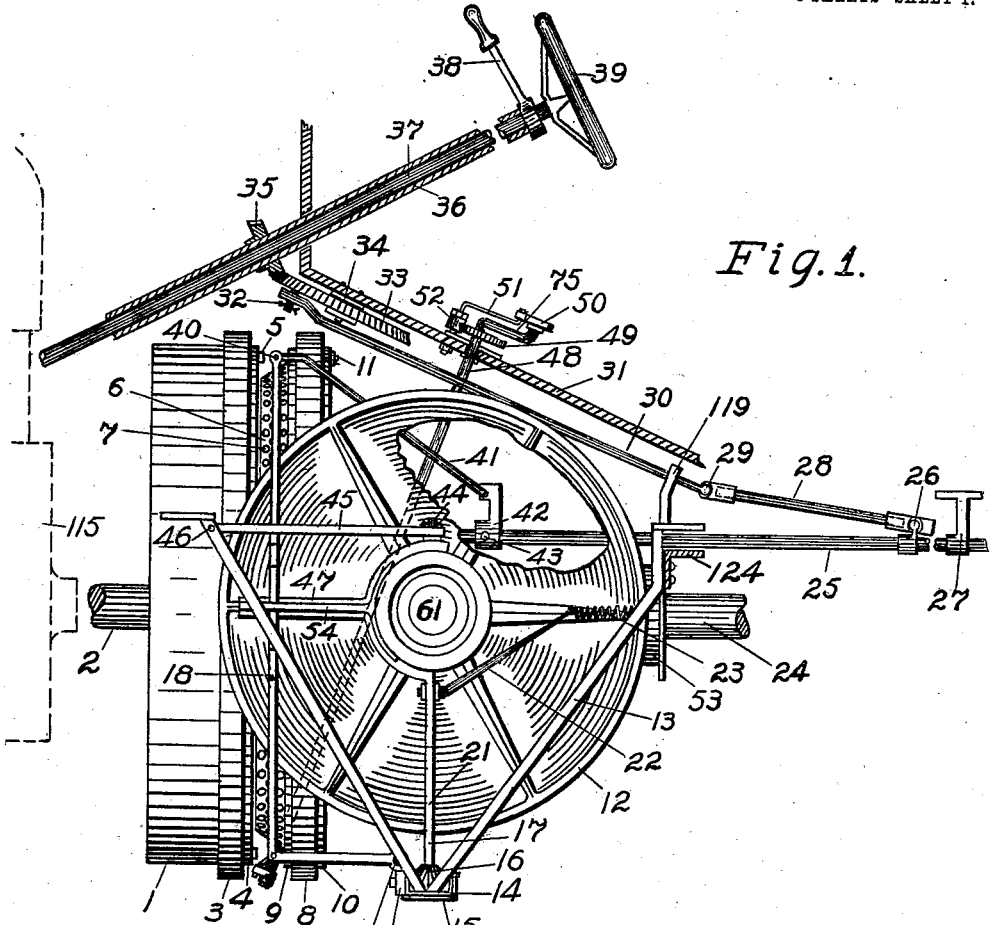
Figure 2:
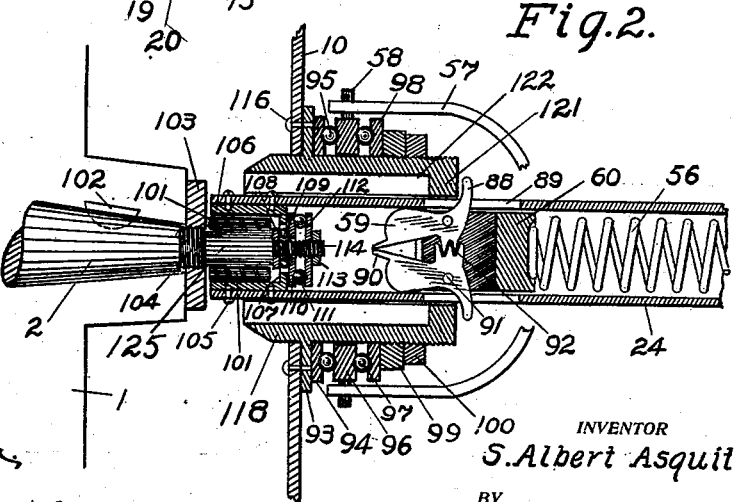

Figure 1 is a side elevation of my improved power transmission device as incorporated in an automobile. Fig. 2 is an enlarged sectional detail view of the spring-controlled locking-means for the main friction-wheel front cone. Fig. 3 is an upper plan view of the transmission device, with parts shown as sectioned away. Fig. 4 is an enlarged sectional detail of a variant form of anti-friction bearing-box for the hubs of the side friction-disks. Fig. 5 is an end elevation of one of the side friction-disks with its bearing-box and ball-bearing supporting means. Fig. 6 is an enlarged detail of the pawl- and ratchet- device for maintaining the parallelism of the foot-pedal. Fig. 7 is a rear elevation of the main friction-wheel and of the side friction-disks. Fig. 8 is a detail elevation of one of the side-levers used for contacting with the outside of the side friction-disks. Fig. 9 is a perspective view of the side friction-disks and their supports and the connections to said side levers. Fig. 10 is an end elevation on a larger scale of the central boxing of the main friction-wheel. Fig. 11 is a detail of the side-lever connections to the pedal rock-shaft.

Similar numbers refer to similar parts throughout the several views.

My improved transmission device is designed especially for use on automobiles, but with slight modifications may be used in other situations where its employment would be desirable and effective.

The numeral 2 denotes the power shaft of a prime motor, to which is keyed a fly-wheel 1 the inner side of whose circumferential rear flange is coned as the counterpart of and to receive in frictional driving-contact the coned forward surface of the main friction-wheel 6. The frustal surface 6 is provided with a plurality of inset blocks of friction-composition, such blocks being slightly projected above said surface, to afford a secure contact with the inner coned surface of said fly-wheel. The wheel-rim 6 is secured to a plate-disk 10 by bolts 11. Lugs 9 project outwardly from the periphery of the rim 6, and an annulus 8 of friction-composition is secured about said rim between the lugs and the disk 10 by said bolts 11. A similar friction-ring 3 is secured about the circumferential periphery of the fly-wheel 1 by means of machine-screws 5, the ring 3 being seated however in an annular groove 4 in said rim 1. The disk 10 is secured by bolts 116 to an annular flange 93 on the outside of the hollow hub 118, the latter being horizontally cored to act as a slide-way for the forward end of a hollow shaft 24, the rear end of the latter being operatively connected by a bevel-gear or otherwise (not shown) with the rotatable rear axle of the vehicle.

A sleeve 106 is inserted into the front end of the shaft 24, and secured thereto by means of screws 105. The journal 125 of the power-shaft 2 extends within the sleeve 106, and anti-friction rollers are interposed therebetween, said rollers being boxed in between the flange 107 of said sleeve and the washer 103 secured about the threaded part 104 of the said shaft 2. The diminished and threaded rear end 114 of the said journal has secured thereon a nut 112 and a lock-nut 113, also a nut 108 within said sleeve 106. A washer 110 about said part 114 next the rear end of said sleeve is spaced away from the nut 112 to permit the balls 111 to move between them, while balls 109 move between the nuts 108 and 109.

The slidable hub 118 is caused to rotate with the hollow shaft 24, by being provided with a feather 123 adapted to slide within a slot in said shaft, as shown in Fig. 10. The hollow hub 118 is caused to slide back or forward over the shaft 24 by the following described mechanism and connections. By means of the hand-wheel 39 the rotatable steering-shaft 37 is rocked in the usual manner, while with the hand-lever 38 the external sleeve 36 may be rotated in either direction, with its pinion 35, the latter intermeshing with the teeth of the bevel-gear-wheel 33 which is pivoted at 34 to the frame-cover 31. The forward end of a connecting-rod 30 is pivoted on a crank-pin extending from the under side of the gear-wheel 33 and is retained by a split-key 32 passed through an orifice in the end of the crank-pin. The rear end of the rod 30 is coupled to a link 28 whose rear end is pivoted to a bearing-projection 26 secured to the rear portion of the horizontal reciprocatory rod 25, whose rear end is slidable and supported within a hanger 27 adapted to be suspended from some convenient part of the machine frame. The forward end of the rod 25 has bifurcations 57 whose ends are pivoted on studs 58 extending from a ring 96 seated about the hub 118. The rear outer portion of the cylindrical surface of the hub 118 is threaded to receive the interiorly threaded ring 99 and lock-ring 100. Washers 94 and 98 are seated about said hub adjacent to the flange 93 and the ring 99 respectively and spaced apart from the ring 96 so as to permit anti-friction balls 95 and 97 to run therebetween. By this connection the hub 118 with the friction-rim 6 may be moved forward into frictional driving-contact with the fly-wheel 1, when it is desired to have the shaft 24 rotate with the same speed. I have adopted a device whereby said friction-rim 6 may be secured in its contact with the fly-wheel 1. In the hollow shaft 24 a sufficient distance back, is fixed a transverse plate 55, to which is secured the rear end of a coiled compression-spring 56, the forward end of said spring being engaged against the rear surface of a slidable block 60, movable longitudinally in said shaft, and having a central axial slot open at the front, in which the latches 59 are pivoted on pintles 91. The rear ends of these latches have outwardly directed projections 88, the forward parts of the latches having points 90 from which rise the shoulders 59. The pintles 91 are spaced apart sufficiently to permit of the lower parts of said latches therebetween being furnished with interlocking dentations 92, whereby the rearward movement of the latches is limited, while the contacting of the points 90 limits the forward movement of the latches. The shaft 24 has slots 89 oppositely placed to receive the projecting portions of the latches 59. When the hub 118 is moved backward the rear end of the hub contacts with the projections 88, and the slide-block 60 is pushed back compressing the spring 56, until the projections have arrived at the rear ends of the slots, when the shoulders 59 of the latches clear the front ends of the slots, emerging therethrough. When the hub is moved forward, its flange 121 pushes down upon the forward ends of the latches until they are below the level of the slots, when the released spring 56 throws the slide-head 60 forward till the projections 88 contact with the fronts of the slots, and in this position tend to tightly hold the friction-rim cone against the fly-wheel. The intermediate part of the shaft 24 is supported by an anti-friction bearing 53 mounted on a transverse bar, and having the anti-friction balls 67 therein.

The composition friction-rings 3 and 8 are of the same outer diameter, and their outer surfaces are adapted to be contacted by the faces of the side friction-disks 12 when it is desired to reverse the machine or to vary the motion of the shaft 24. The friction disks are ordinarily arranged to have their inner faces parallel to each other except when shifted so as to come into bearing-contact with the said friction-rings 3 and 8. The friction-disks 12, which have reinforcing radial ribs on their outer faces, have sockets 62 which are bolted to the inner ends of journals 61 set therein, the latter projecting outwardly into bearing-boxes 67. A nut—65 secured by a lock-nut 66, is placed on the threaded outer end of each journal, and anti-friction balls 63 are housed between the coned nut 65 and a dished washer 64 on each end of each said journal. A variant form of anti-friction bearing for the journals is shown in Fig. 4, where the outer ends of the journals are diminished in diameter, and such diminished parts received into sockets 71 which have radial flanges between which and the end plate 72 of the box the anti-friction balls 70 are seated, while balls 69 are seated between bearing-rings attached respectively to said journals and to said boxing 68.

One end of a coiled tension spring 23 is secured to the frame 13, its other end connected to the end of an arm 22 extending from the upright 21 secured to the boxing 67, to normally keep the inner bearing-surfaces of the friction-disks 12 out of contact with the friction-rings 3 and 8. The outer end of the arm 22 extends outward from the upright 21 at a considerable angle, and since the said upright with its supported boxing 67 has a pivotal connection at 16, the spring 23 exercises a decided tractive effort upon the said arm which tends to throw outward the forward portion of the disk 12.

Referring to Figs. 1, 5 and 9, it will be seen that the journal-boxes of said friction-disks are supported on each side by an upright 21 whose lower end is of spherical form at 74, adapted to be seated in a box 16 set in one end of the channel-bar 14, the ends of the latter being hung from hangers 13 whose upper ends are adapted to be supported by the machine-frame. The boxings 16 are secured in place on said transverse bar 14 by clamping-bolts 15. A stud 44 projects from the upper side of the journal-box 67, and on this is pivoted one end of a rod 45, whose forward end is fixed to the upper end of the forward hanger 13 by a bolt 46. The said friction-disks are thus permitted some rocking movement from side to side about the pivotal points at the sphere 74 and the stud 44. The numeral 20 denotes a lug on the forward portion of the transverse bar 14 to which is pivoted the end of the horizontal rearwardly turned member of a lever 18. The intermediate part of the vertical member of said lever is bent outwardly so as to clear the radial ribs on the outside of the friction-disks 12 when it moves over them. The upper end of each lever 18 has a bearing-orifice 81 to receive a pintle on the forward end of the link 41, the rear end of the latter being pivotally connected to a projecting member 42 secured to the slide-rod 25 by a bolt or pin 43. An orifice 82 in the angle between the vertical and horizontal limbs of said lever is adapted to receive a pintle 124 extending from a sleeve 87 movable on the lower end of the rock-shaft 48 between a collar 84 secured to the shaft by a set-screw 86, and a crank 85 secured to the shaft by a set-screw 125. A transverse rod 83 has one end pivotally connected to the end of the crank 85, and secured thereto by split-keys 120, and its other end secured to the lower end of the other lever 18. The upper end of the rock-shaft 48 has a crank 75 with a foot-pedal 50 pivotally connected to the end of the crank, as shown in Fig. 6. Secured to said rock-shaft below the crank is a ratchet-wheel 49, adapted to be engaged by a pawl 52, the latter pivoted on a stud extending upwardly from the frame 31. A link 51 is pivotally connected between a projection 76 on said pedal 50 and the projection on crank-member 78 of said pawl. A stop 77 is provided to prevent the pawl from being thrown up too far. This pawl and gear device is adapted to maintain the parallelism of the pedal 50, as indicated by the dotted lines in Fig. 6.

The side-levers 18 each pass between the arms of a loop extending from the boxing 67, at 47 and 54, as more clearly indicated in Fig. 9, and each lever is movable synchronously with the other forward or back as determined by the action of the rod 25 and link-connection 41. Since both the friction-wheel 6 and the levers 18 are pivotally connected to the same slide-rod 25, when the said rod is moved either way, the levers 18 follow the movement synchronously with the movement of the said wheel 6. Since the levers 18 do not normally contact with the outer faces of the friction-disks 12, the latter remain spaced away from the friction-rings 3 and 8 when the rim 6 is in actual driving-contact with the wheel 1 for high speed. When less than high speed is desired, the lever 38 is thrown the proper amount to set the friction-rim 6 and ring 8 the necessary distance back. The pedal 50 is then depressed which rocks the shaft 48, thereby pressing the levers 18 inwardly against the bars 47, which results in shifting the friction-disks sufficiently to cause their inner faces to contact simultaneously with both of the rings 3 and 8, the rotating ring 3 setting the disks into rotation and the disks then rotating the ring 8 and rim 6 with the shaft 24, the speed of rotation of the latter being determined by the distance the contacting edge of the ring 8 is from the centers of said disks. If the ring 8 is pushed back past the center of the said disks, the machine is reversed, and the speed of rotation in backing up is graduated in the same manner as above described, by shifting the contact of the ring 8 nearer to or farther away from the center of the disks. The machine is stopped by a reverse movement of the pedal 50, which lifts the levers 18 permitting the springs 23 to throw the disks 12 out of contact with the rings 3 and 8. It will be observed, as shown in Fig. 4 where the dotted lines indicate the positions of the parts 18 and 8 at 18' and 8' when shifted back to slow up the speed, that the lever 18 is shifted back simultaneously with the ring 8, and thus keeps an intermediate position upon the bar 47 between the rings 3 and 8. In this way the lever 18 keeps up an equal pressure upon both rings by the said side friction disks 12, and with the same pressure no matter what the extent of the shifting is.

It should be noted that the lever 18 being pivoted at its lower end as shown its middle portion which exercises the compression over the bar 47 moves through an arc only one-half as long as the arc described by the upper end thereof. Therefore, while the rod 25 moves over a space sufficient to carry the friction-ring 8 along nearly the whole diameter of the side friction-disks, yet the lever 18 will only move one half as far, and thus retain its position midway between the friction-rings 3 and 8 at all times, exercising an equal pressure upon both said rings.

Having described my invention, what I claim as new, and desire to secure by Letters Patent, is:—

1. A device of the character described, comprising in combination, a rotatable driving-shaft, a friction-wheel mounted thereon, a rotatable driven-shaft, a main friction-disk slidably but non-rotatably mounted thereon, side friction-disks rotatably mounted with their inner faces in juxtaposition to the circumferential bearing-edges of both said friction-wheel and main friction-disk, and means for causing said side friction-disks to bear equally upon the edges of said friction-wheel and main friction-disk.

2. A device of the character described, comprising in combination, a rotatable driving-shaft, a friction-wheel mounted thereon, a rotatable driven-shaft, a main friction-disk slidably but non-rotatably mounted thereon, side friction-disks rotatably mounted with their inner faces in juxtaposition to the circumferential bearing-edges of both said friction-wheel and main friction-disk, means for causing said side friction-disks to bear equally upon the edges of said friction-wheel and main friction-disk, and other means for retracting said side friction-disks from bearing-contact with said friction-wheel and main friction-disk when said compressing means are released therefrom.

3. A device of the character described, comprising in combination, a rotatable driving-shaft, a friction-wheel mounted thereon having engaging-means on its rear face, a rotatable driven-shaft, a main friction-disk slidably but non-rotatably mounted on said driven-shaft having on its front face engaging-means adapted to be placed in or separated from the engaging-means on the rear surface of said friction-wheel, side friction-disks rotatably mounted and adapted to have their inner faces shifted into or out of driving-contact with both the circumferential edges of said friction-wheel and main friction-disk simultaneously, and means for causing the said side friction-disks to bear with equal pressure upon the edges of said friction-wheel and said main friction-disk.

4. A device of the character described, comprising in combination, a rotatable driving-shaft, a friction-wheel mounted thereon having engaging-means on its rear face, a rotatable driven-shaft, a main friction-disk slidably but non-rotatably mounted on said driven-shaft and having on its front face engaging-means adapted to be placed in or separated from the engaging-means on the rear surface of said friction-wheel, side friction-disks rotatably mounted and adapted to have their inner faces shifted into or out of driving-contact with both the circumferential edges of said friction-wheel and main friction-disk simultaneously, means for causing the said side friction-disks to bear with equal pressure upon the edges of said friction-wheel and said main friction-disk, and other means for retracting said side-friction disks from bearing-contact with said friction-wheel and main friction-disk when said compressing-means are released therefrom.

5. A device of the character described, comprising in combination, a rotatable driving-shaft, a friction-wheel mounted thereon having engaging-means on its rear face, a rotatable hollow oppositely slotted driven-shaft, resilient latches slidable therein and adapted to project through the slots to detachably lock the main friction-disk in its extreme forward position, a main friction-disk slidably but non-rotatably mounted on said hollow driven-shaft and means for engaging said latches in certain positions, said main-friction-disk having on its front face engaging-means adapted to be placed in or separated from the engaging-means on the rear face of said friction-wheel, and side friction-disks rotatably mounted and adapted to have their inner faces shifted into or out of driving-contact with both the circumferential edges of said friction-wheel and said main friction-disk.

6. A device of the character described, comprising in combination, a rotatable driving-shaft, a friction-wheel mounted thereon, a rotatable driven-shaft, a main friction-disk slidably but non-rotatably mounted thereon, side friction-disks rotatably mounted with their inner faces in juxtaposition to the circumferential bearing-edges of both said friction-wheel and main friction-disk, means for causing an equal bearing-compression between the inner bearing-surfaces of the side disks and the edges of the friction-wheel and main friction-disk, such compression means being adapted to be shifted simultaneously with the shifting of the main friction-disk and exercise its compressive action upon said side-disks at all times intermediately between said friction-wheel and main friction-disk.

Signed at Waterloo, Iowa, this 15th day of July, 1907.

S. ALBERT ASQUITH.

Witnesses:
H. M. HARPER,
O. D. YOUNG.